(12) United States Patent
Pratt et al.

(10) Patent No.: US 10,877,159 B2
(45) Date of Patent: Dec. 29, 2020

(54) METHOD AND SYSTEM FOR SATELLITE SIGNAL PROCESSING

(71) Applicant: QINETIQ LIMITED, Farnborough (GB)

(72) Inventors: Anthony Pratt, Brixworth (GB); Christopher James Mather, Camberley (GB)

(73) Assignee: QINETIQ LIMITED, Farnborough (GB)

( * ) Notice: Subject to any disclaimer, the term of this patent is extended or adjusted under 35 U.S.C. 154(b) by 46 days.

(21) Appl. No.: 16/099,818

(22) PCT Filed: May 18, 2017

(86) PCT No.: PCT/EP2017/061984
§ 371 (c)(1),
(2) Date: Nov. 8, 2018

(87) PCT Pub. No.: WO2017/198774
PCT Pub. Date: Nov. 23, 2017

(65) Prior Publication Data
US 2019/0113628 A1    Apr. 18, 2019

(30) Foreign Application Priority Data

May 20, 2016  (GB) .................................. 1608940.1

(51) Int. Cl.
*G01S 19/32* (2010.01)
(52) U.S. Cl.
CPC .................... *G01S 19/32* (2013.01)
(58) Field of Classification Search
CPC .......... G01S 19/09; G01S 19/24; G01S 19/31; G01S 19/32
See application file for complete search history.

(56) References Cited

U.S. PATENT DOCUMENTS 6,665,612 B1   12/2003   Brodie et al.
7,151,486 B2   12/2006   Kim
(Continued)

FOREIGN PATENT DOCUMENTS

| AU | 2011265571 A1 | 2/2012 |
|---|---|---|
| RU | 2013137442 A | 2/2015 |
| WO | 2012096774 A1 | 7/2012 |

OTHER PUBLICATIONS

Jul. 21, 2017 International Search Report issued in International Patent Application No. PCT/EP2017/061984.
(Continued)

*Primary Examiner* — Dao L Phan
(74) *Attorney, Agent, or Firm* — Oliff PLC

(57) ABSTRACT

A method of tracking a plurality of signals from a single satellite comprises receiving a first signal transmitted by a satellite; receiving at least a second signal transmitted by the same satellite; applying a pre-filtering process to determine the cumulative in-phase and quadrature components of the first, second signals, and optionally any further signals; and applying a filtering process to the cumulated in-phase and quadrature components of the first and at least second signals to determine a range and range rate of the satellite; wherein the filtering process comprises applying a Kalman filter. The method results in a determination of the range and range rate from a single satellite with improved signal to noise ratio. The range and range rate so determined may be used, with data from other satellites, to produce a navigational position. The method may be used with each such satellite used in producing the navigational position.

5 Claims, 2 Drawing Sheets

(56) References Cited

U.S. PATENT DOCUMENTS

| | | |
|---|---|---|
| 2004/0135721 A1 | 7/2004 | Hoven et al. |
| 2007/0211791 A1 | 9/2007 | Ganguly et al. |
| 2008/0165053 A1 | 7/2008 | Liu et al. |
| 2016/0238695 A1* | 8/2016 | Theurer ................ G01S 13/958 |

OTHER PUBLICATIONS

Jul. 21, 2017 Written Opinion issued in International Patent Application No. PCT/EP2017/061984.
October 26, 2016 Search Report issued in British Patent Application No. 1608940.1.
Jun. 18, 2020 Office Action issued in Russian Patent Application No. 2018143414/07(072412).

* cited by examiner

METHOD AND SYSTEM FOR SATELLITE SIGNAL PROCESSING

SUMMARY

The present embodiments relate to a method of and system for tracking a plurality of signals from a single satellite, where first and second signals sent by the same satellite are received and filtered to determine a range and range rate of the satellite.

Satellite navigation systems utilise a series of satellites in a medium earth orbit (MEO) position that provide autonomous geo-spatial positioning information. Such satellites are typically at an altitude of 20,000 km, with an orbital period of approximately 12 hours. Electronic receivers, commonly known as "sat-navs" use such satellites to establish location to a precision of within a few meters, taking time signals transmitted along a line of sight from the satellites to the receiver to determine longitude, latitude and altitude. The time signals also allow time synchronisation to a high precision by calculation of current local time. A satellite navigation system with global coverage is generally termed a global navigation satellite system, or GNSS. There are (as of 2013) two GNSS that are global operation GNSSs: NAVSTAR (a US GPS or global positioning system) and GLONASS (a Russian system), with systems in China (Beidou) and Europe (Galileo) in various stages of development, as are other regional systems.

GNSS receivers use a plurality of signal tracking loops, each of which is dedicated to a different signal type and/or satellite. Each signal transmitted by the satellite comprises time information (the time at which the signal is transmitted) and position information (the position at which the signal is transmitted). Typically a signal is received, with in-phase and quadrature (90° or π/2 out of phase) components then filtered and the time/position data used as the basis to determine the range of the satellite (distance between the satellite and the receiver) and the range-rate of the satellite (velocity at which the satellite is travelling relative to the receiver).

However, signals received from the same satellite where the range between the satellite and the receiver is the same will arrive at different times due to delay differences in processing within the receiver. For example, these may be due to passing through filters of different bandwidths, or various external factors, such as ionospheric or tropospheric delay. Ionospheric delay is frequency dependent and affected by both the elevation angle of the satellite (above the local user's tangent plane) and the total electron count along the signal path between the satellite and the receiver. Tropospheric delay comprises a component dependent on the passage of the signal through a dry atmosphere, and a component, less easily determined, dependent on the passage of the signal through a wet atmosphere. Consequently solutions to remove the ionospheric delay component in signal processing for multiple signals from single satellite have been proposed, for example, as in U.S. Pat. No. 7,151,486, and whilst successful to a degree, work on the basis of two carrier signals. There is also the issue of the coherence delay in any ionospheric delay estimation, which may be significant. Alternative solutions involve the use of a third carrier signal that allows rapid resolution of any carrier phase ambiguity, but these suffer from poor signal-to-noise ratios in practice. The angle at which a signal is received will also in part determine the errors due to ionospheric or tropospheric delay. The angle affects the distance in each medium that the signal has travelled before reaching the receiver, and thus contributes to the amount of delay the signal has experienced.

In most situations a single receiver will receive a plurality of signals of different types at any one point in time. To be able to produce a single estimate for position, velocity and time (PVT) or position, navigation and time (PNT) a conventional receiver needs to be able to process a desired single type of signal (such as a GPS L1 C/A signal) received from a plurality of satellites. Combining many signals causes an increase in errors, since errors due to ionospheric and tropospheric delay and the noise-to-signal ratio, amongst others, will vary with the relative position (angle and distance) of the receiver and the satellite. Thus each signal of interest will have its own inherent errors, which will be different to every other signal of that type received from other satellites. Filtering techniques are used to reduce these errors when combining a plurality of the same type of signal, where a mathematical filtering function is applied to the combined signal and error data. For example, least squares filtering techniques are used commonly, and Kalman filters may also be used. The filtered data results in a far more accurate signal estimate than would be otherwise available. Such mathematical methods lend themselves well to this type of filtering of a single signal type from a plurality of sources.

Neither the removal of ionospheric component nor the use of a third carrier signal take into account the issue of environments where GNSS signal may be denied, for example by jamming. Such signals still require tracking, on the assumption that not all GNSS signals would be simultaneously jammed. This, in conjunction with the issue of signal-to-noise degradation, which is a fundamental issue of known techniques, leads to the need to be able to track multiple signals from a single satellite source, regardless of environment.

The present embodiments aim to address these problems by providing a method of tracking a plurality of signals from a single satellite, comprising: receiving a first signal transmitted by a satellite; receiving at least a second signal transmitted by the same satellite; applying a pre-filtering process to determine the cumulative in-phase and quadrature components of the first and at least second signals; and applying a filtering process to the cumulated in-phase and quadrature components of the first and at least second signals to determine a range and range rate of the satellite; wherein the filtering process comprises applying a Kalman filter.

The output of the Kalman filter comprises an estimate of the range to the single satellite and an estimate of the range-rate. The range, and range rate, when extracted in similar fashion from a plurality of satellites (generally at least four being required), may be used to produce a single estimate for PVT or PNT. Thus, the above method is advantageously repeated using a plurality of satellites.

The use of a Kalman filter to process a plurality of signals from a single satellite provides an improved navigational ability because as a result of the action of the Kalman filter the signal-to-noise ratio of the estimates of range and range-rate to the satellite concerned is improved. A consequence is that signals having a higher signal-to-noise ratio may be used to compensate for signals having a lower signal-to-noise ratio received from the same satellite. The issue of signal jamming becomes less problematic due to this ability.

The first and at least second signals may have different frequencies.

Preferably, the first and at least second signals have the same frequency. In this situation, the first and at least second signals may be transmitted at different times.

Preferably the method is repeated using signals from a plurality of different satellites to produce range and range rate for each satellite, and a position of an object is calculated using the range and range-rate estimates from a multiplicity of satellites. The estimates of range and range rate obtained from a single satellite, as described herein, are improved in accuracy by the Kalman filter process. Thus, an improved navigational fix may be obtained when using this more accurate data. Although the method is preferably employed with each satellite being used to provide a navigational position, it still provides benefit when used with just one, or a larger sub-set of the satellites in use.

In another aspect, the present embodiments also provide a system for tracking a plurality of signals from a single satellite, comprising: a receiver unit adapted to receive a first signal transmitted by a satellite and at least a second signal transmitted by the same satellite; and a microprocessor adapted to apply a pre-filtering process to determine the cumulative in-phase and quadrature components of the first and at least second signals, and a filtering process to the cumulative in-phase and quadrature components of the first and at least second signals to determine a range and range rate of the satellite; wherein the filtering process comprises applying a Kalman filter.

BRIEF DESCRIPTION OF THE DRAWINGS

The present embodiments will now be described by way of example only, and with reference to the accompanying drawings, in which.

DETAILED DESCRIPTION OF THE EMBODIMENTS

The present embodiments take the approach of using a Kalman filter as the basis of a tracking architecture for a plurality of signals received by a receiver from the same satellite. By receiving a first signal transmitted by a satellite and receiving a second signal transmitted by the same satellite, a pre-filtering process may be applied to determine the cumulative in-phase and quadrature components of the first and second signals. This then allows a filtering process to be applied to the cumulative in-phase and quadrature components of the first and second signals to determine a range and range rate of the satellite. The filtering process is a Kalman filter, which offers a number of advantages when used in relation to signals from a single satellite, as described in more detail below.

Figure 1:
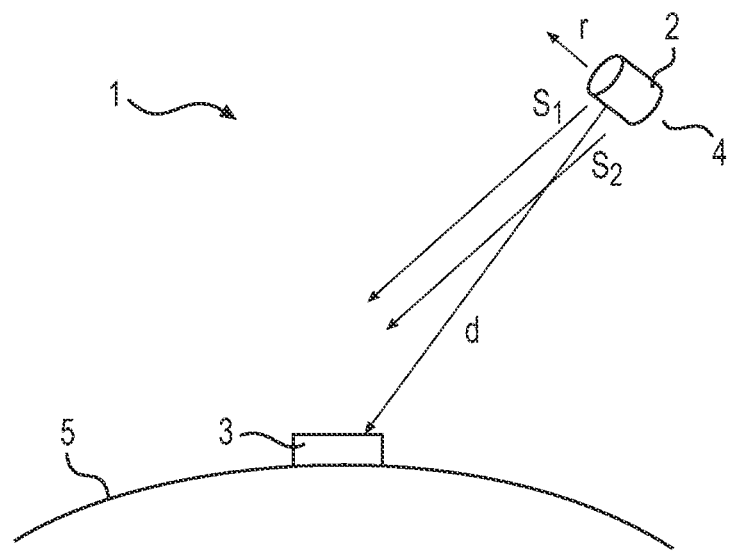
FIG. 1 shows a schematic diagram of a satellite and receiver unit set up to function as part of a GNSS network within a first embodiment of the present embodiments.

FIG. 1 shows a schematic diagram of a satellite and receiver unit set up to function as part of a GNSS network within a first embodiment of the present embodiments. The network 1 comprises a satellite 2 (with further satellites within the network not shown) and a receiver unit 3. The satellite 2 is in an orbit 4 above the surface of the Earth 5, and the receiver unit 3 is positioned on the surface of the Earth 5. The satellite 2 is positioned such that it is separated from the receiver unit 3 by a range r, and the relative velocity between the satellite 2 and the receiver unit 3 is a range-rate v. At time $t_1$, the satellite 2 transmits a first signal $s_1$ having a frequency $f_1$ to the receiver unit 3. At time $t_2$, the same satellite 2 transmits a second signal $s_2$ also having a frequency $f_1$ to the receiver unit 3.

Figure 2:
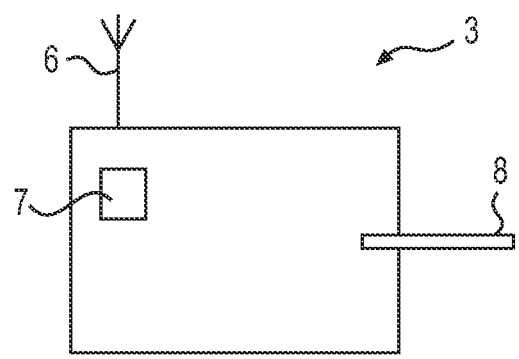
FIG. 2 is a schematic representation of a receiver unit used in the network of FIG. 1.

FIG. 2 is a schematic representation of a receiver unit used in the network of FIG. 1. The receiver unit 3 comprises a receiver 6, a microprocessor 7 and a display output 8. The display output 8 may be integral with the receiver unit 3 (such as a liquid crystal display or other visual display) or may be connected directly or indirectly to a display (such as via a bus or other similar connection device, with or without further hardware or processing means connected in-between). The first signal $s_1$ and the second signal $s_2$ are received at the receiver 6. The microprocessor 7 comprises pre-filtering means to firstly select the in-phase and quadrature components of the first $s_1$ and second $s_2$ signals, and secondly to sum the like components together, forming cumulative in-phase and quadrature outputs. The cumulative in-phase and quadrature components are then subjected to a filtering process to determine a range and range rate of the satellite 2. The filtering process comprises using a Kalman filter.

A Kalman filter is a linear quadratic estimator that uses a dynamic model of a system, such as physical laws of motion, known control inputs to the system and multiple sequential measurements to form an estimate of the varying quantities of the system that is more accurate than an estimate obtained using any one measurement alone. The Kalman filter averages a prediction of the state of a system using weighted averages, such that the result of the weighted average calculation is state that lies between a measured state and an estimated state, but is more accurate than either alone due to its estimated uncertainty. The process is a recursive iterative process, since only the new estimate and its covariance (used in the weighting system as an estimate of uncertainty in the predicted state) are used in the next iteration. The uncertainty of the measurements can be difficult to quantify, hence the performance of the filter is often discussed in terms of gain. A low Kalman gain places emphasis on the predictions, smoothing out noise in the data, and a high Kalman gain places emphasis on the measurements.

The Kalman filter model assumes the true state of a system at time k is evolved from the state at time k−1, according to Equation 1:

$$x_k = F_k x_{k-1} + B_k u_k + w_k \qquad \text{Equation 1}$$

Where
$F_k$ is the state transition model applied to the previous state at $x_{k-1}$
$B_k$ is the control-input model applied to the control vector $u_k$
$W_k$ is the noise based on a normal distribution of covariance $Q_k$, $w_k \sim N(0, Q_k)$
At time k an observation of $z_k$ of the true state $x_k$ is made according to Equation 2:

$$z_k = H_k x_k + v_k \qquad \text{Equation 2}$$

Where $H_k$ is the observation model that maps the true state space into the observed space and $v_k$ is the observation noise that is assumed to be a zero mean Gaussian distribution with covariance $R_k$, $v_k \sim N(0, R_k)$. The initial state and the noise vectors at each step are assumed to be independent.

Once the Kalman filter has been applied to the first $s_1$ and second $s_2$ signal components and the range and range-rate ascertained, these are fed into the algorithm run by the microprocessor 7 that determines the position of the receiver unit 3 by triangulating signals from several satellites. This enables the accurate determination of longitude, latitude and altitude. The Kalman filter approach may be used for a plurality of signals received from each single satellite used in the triangulation process, or for one or more depending on environmental conditions and/or signal strength.

Utilising the Kalman filter to determine the range and range rate and therefore track the signals from a single satellite offers many advantages. By combining the tracking of several satellite signals into a single tracking filter, stronger signals can be used to aid the tracking of weaker ones. Reacquisition of signals following signal outages is performed more rapidly as estimates of the range and range-rate are maintained by tracking the remaining signals, for example, if a particular frequency signal is blocked, or a particular satellite is unavailable. The noise in the estimate presented to the measurement generation algorithm that determines the position of the receiving unit 2 is also reduced since more signals are utilised, leading to more accurate navigation solutions. In additional, a model of ionospheric and tropospheric delays is maintained by the filter with a correlation time of minutes or longer, again sufficient to maintain performance even with significant signal outage.

Variations in signal strength may be caused by a variety of effects, including slow fading effects (for example, multipath signals and signal obscuration by objects such as buildings in fixed-site operation), or fast fading effects (multipath signal issues for mobile site operation). If the variations are rapid, for example at frequencies higher than 10-20 Hz, the Kalman filtering method can be used to reject such variations in position determination. If one or two signals are jammed, either intentionally or unintentionally, the method of the present embodiment compensates for the loss of signal by utilising any other remaining frequency signals being transmitted by a satellite to maintain the tracking filter performance.

Figure 3:
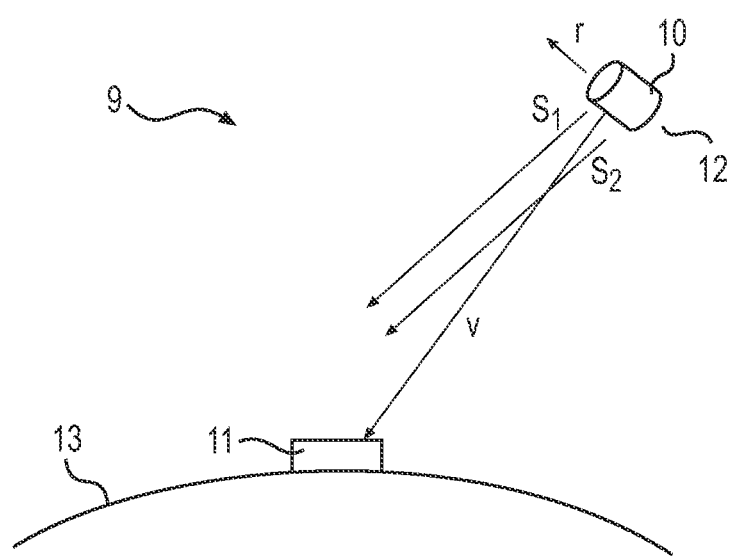
FIG. 3 shows a schematic diagram of a satellite and receiver unit set up to function as part of a GNSS network as part of a second embodiment of the present embodiments.

In an alternative embodiment of the present embodiments, this aspect of the Kalman filter is explored further. FIG. 3 shows a schematic diagram of a satellite and receiver unit set up to function as part of a GNSS network as part of a second embodiment of the present embodiments. The network 9 comprises a satellite 10 (with further satellites within the network not shown) and a receiver unit 11. The satellite 10 is in an orbit 12 above the surface of the Earth 13, and the receiver unit 11 is positioned on the surface of the Earth 13. The satellite 10 is positioned such that it is separated from the receiver unit 11 by a range r, and the relative velocity between the satellite 10 and the receiver unit 11 is a range-rate v. At time $t_1$, the satellite 10 transmits a first signal $s_1$ having a frequency $f_1$ to the receiver unit 11. At time $t_1$, the same satellite 10 also transmits a second signal $s_2$ having a frequency $f_2$ to the receiver unit 11, where $f_1 \neq f_2$. As described above with reference to FIG. 2, the receiver unit 11 comprises a receiver 6, a microprocessor 7 and a display output 8. The display output 8 may be integral with the receiver unit 11 (such as a liquid crystal display or other visual display) or may be connected directly or indirectly to a display (such as via a bus or other similar connection device, with or without further hardware or processing means connected in-between). The first signal $s_1$ and the second signal $s_2$ are received at the receiver 6. The microprocessor 7 comprises pre-filtering means to firstly select the in-phase and quadrature components of the first $s_1$ and second $s_2$ signals, and secondly to sum the like components together, forming cumulative in-phase and quadrature outputs. The cumulative in-phase and quadrature components are then subjected to a filtering process to determine a range and range rate of the satellite 2. As also described above, the filtering process comprises using a Kalman filter.

Other embodiments falling within the scope of the claims will be apparent to those skilled in the art. For example, the receiver unit 3, 11, may be stationary (fixed-site operation), moving (mobile operation), a stand-alone unit or incorporated into another device, may be on the surface of the Earth or in or on a moving object above the surface of the Earth, such as an aeroplane.

The invention claimed is:

1. A method for tracking a plurality of signals from a single satellite, the method comprising:
   a first step of receiving a first signal transmitted by a first satellite;
   a second step of receiving at least a second signal transmitted by the first satellite;
   a third step of applying a pre-filtering process to the first signal and the at least second signals to determine the cumulative in-phase and quadrature components of the first signal and the at least second signals;
   a fourth step of applying a Kalman filter to the cumulative in-phase and quadrature components of the first signal and the at least second signals to determine a range and range rate of the first satellite
   a fifth step of receiving signals from a plurality of different satellites;
   after the range and range rate of the first satellite is determined in the fourth step, a sixth step of repeating the third step and fourth step based on the received signals from the plurality of different satellites to determine range and range rate for each satellite; and
   a seventh step of calculating a position of an object based on the determined range and range-rate data of the first satellite and the different satellites.

2. The method according to claim 1, wherein the first and at least second signals have different frequencies.

3. The method according to claim 1, wherein the first and at least second signals have the same frequency.

4. The method according to claim 3, wherein the first and at least second signals are transmitted at different times.

5. A system for tracking a plurality of signals from a single satellite, the system comprising:
   a receiver configured to receive a first signal transmitted by the single satellite and at least a second signal transmitted by the single satellite; and
   a microprocessor programmed to:
     apply a pre-filtering process to the first and the at least second signals to determine the cumulative in-phase and quadrature components of the first and the at least second signals, and
     apply a Kalman filter to the cumulative in-phase and quadrature components of the first and at least second signals to determine a range and range rate of the single satellite.

* * * * *